(12) United States Patent
Dommety et al.

(10) Patent No.: US 7,447,188 B1
(45) Date of Patent: Nov. 4, 2008

(54) METHODS AND APPARATUS FOR SUPPORTING MOBILE IP PROXY REGISTRATION IN A SYSTEM IMPLEMENTING MULITPLE VLANS

(75) Inventors: Gopal Dommety, San Jose, CA (US); Waseem Siddiqi, Santa Clara, CA (US); Kent Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 10/874,679

(22) Filed: Jun. 22, 2004

(51) Int. Cl.
*H04B 7/216* (2006.01)
(52) U.S. Cl. ..................................... 370/342; 370/392
(58) Field of Classification Search ................. 370/392, 370/342; 709/227, 238, 220; 713/171
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,276,680 A | 1/1994 | Messenger |
| 5,371,852 A | 12/1994 | Attanasio et al. |
| 5,473,599 A | 12/1995 | Li et al. |
| 5,490,139 A | 2/1996 | Baker et al. |
| 5,570,366 A | 10/1996 | Baker et al. |
| 5,572,528 A | 11/1996 | Shuen |
| 5,619,552 A | 4/1997 | Karppanen et al. |

(Continued)

FOREIGN PATENT DOCUMENTS

EP 0924913 A1 6/1999

(Continued)

OTHER PUBLICATIONS

Network Working Group, RFC 2002 "IP Mobility Support," Oct. 1996, 80 pgs.

(Continued)

*Primary Examiner*—Duc Nguyen
*Assistant Examiner*—Wayne Cai
(74) *Attorney, Agent, or Firm*—Weaver Austin Villeneuve & Sampson LLP (57) ABSTRACT

Methods and apparatus for implementing proxy Mobile IP in a system implementing multiple VLANs are disclosed. Specifically, a network device such as an Access Point or Foreign Agent supports multiple VLANs on a plurality of interfaces. In addition, the network device implements proxy Mobile IP on at least one interface. The network device ascertains a subnet map of a node, where the subnet map corresponds to a VLAN. It then identifies a Home Agent associated with the subnet map or VLAN via which to register the node. The network device then composes a registration request on behalf of the node, where the registration request identifies the node (e.g., IP address) and includes a Home Agent address associated with the Home Agent. The registration request also directly or indirectly indicates the interface corresponding to the VLAN via which data packets are to be routed. The registration request is then sent on behalf of the node. A registration reply that indicates success or failure of the proxy registration performed on behalf of the node is then received. Upon successful proxy registration, data packets may be transmitted on the VLAN interface of the network device.

70 Claims, 6 Drawing Sheets

U.S. PATENT DOCUMENTS

| | | | |
|---|---|---|---|
| 5,729,537 | A | 3/1998 | Billström |
| 5,751,799 | A | 5/1998 | Mori |
| 5,805,702 | A | 9/1998 | Curry et al. |
| 5,825,759 | A | 10/1998 | Liu |
| 5,862,345 | A | 1/1999 | Okanoue et al. |
| 5,978,672 | A | 11/1999 | Hartmaier et al. |
| 6,016,428 | A | 1/2000 | Diachina et al. |
| 6,055,236 | A | 4/2000 | Nessett et al. |
| 6,061,650 | A | 5/2000 | Malkin et al. |
| 6,075,783 | A | 6/2000 | Voit |
| 6,078,575 | A | 6/2000 | Dommety et al. |
| 6,079,020 | A | 6/2000 | Liu |
| 6,081,507 | A | 6/2000 | Chao et al. |
| 6,122,268 | A | 9/2000 | Okanoue et al. |
| 6,131,095 | A | 10/2000 | Low et al. |
| 6,137,791 | A | 10/2000 | Frid et al. |
| 6,144,671 | A | 11/2000 | Perinpanathan et al. |
| 6,154,839 | A | 11/2000 | Arrow et al. |
| 6,163,843 | A | 12/2000 | Inoue et al. |
| 6,167,513 | A | 12/2000 | Inoue et al. |
| 6,172,986 | B1 | 1/2001 | Watanuki et al. |
| 6,173,399 | B1 | 1/2001 | Gilbrech |
| 6,175,917 | B1 | 1/2001 | Arrow et al. |
| 6,195,705 | B1 | 2/2001 | Leung |
| 6,226,748 | B1 | 5/2001 | Bots et al. |
| 6,226,751 | B1 | 5/2001 | Arrow et al. |
| 6,230,012 | B1 | 5/2001 | Wilkie et al. ................ 455/435 |
| 6,240,089 | B1 | 5/2001 | Okanoue et al. |
| 6,256,300 | B1 | 7/2001 | Ahmed et al. |
| 6,272,129 | B1 | 8/2001 | Dynarski et al. ............ 370/356 |
| 6,308,267 | B1 | 10/2001 | Gremmelmaier ............ 713/168 |
| 6,339,830 | B1 | 1/2002 | See et al. |
| 6,377,982 | B1 | 4/2002 | Rai et al. |
| 6,393,482 | B1 | 5/2002 | Rai et al. |
| 6,396,828 | B1 | 5/2002 | Liu ............................. 370/352 |
| 6,400,722 | B1 | 6/2002 | Chuah et al. |
| 6,445,922 | B1 | 9/2002 | Hiller et al. |
| 6,452,920 | B1 | 9/2002 | Comstock |
| 6,466,964 | B1 | 10/2002 | Leung et al. ................ 709/202 |
| 6,473,413 | B1 | 10/2002 | Chiou et al. ................ 370/331 |
| 6,496,491 | B2 | 12/2002 | Chuah et al. |
| 6,496,855 | B1 | 12/2002 | Hunt et al. .................. 709/217 |
| 6,510,144 | B1 | 1/2003 | Dommety et al. |
| 6,515,974 | B1 | 2/2003 | Inoue et al. |
| 6,522,880 | B1 | 2/2003 | Verma et al. |
| 6,535,493 | B1 | 3/2003 | Lee et al. .................... 370/329 |
| 6,571,289 | B1 | 5/2003 | Montenegro |
| 6,577,643 | B1 | 6/2003 | Rai et al. .................... 370/466 |
| 6,578,085 | B1 | 6/2003 | Khalil et al. ................ 709/241 |
| 6,587,882 | B1 * | 7/2003 | Inoue et al. ................. 709/227 |
| 6,597,882 | B1 | 7/2003 | Tanaka |
| 6,625,135 | B1 | 9/2003 | Johnson et al. ............. 370/332 |
| 6,651,105 | B1 | 11/2003 | Bhagwat et al. ............ 709/239 |
| 6,657,981 | B1 | 12/2003 | Lee et al. |
| 6,665,537 | B1 | 12/2003 | Lioy ....................... 455/435.1 |
| 6,683,871 | B1 | 1/2004 | Lee et al. |
| 6,684,241 | B1 * | 1/2004 | Sandick et al. ............. 709/220 |
| 6,701,437 | B1 | 3/2004 | Des et al. |
| 6,707,809 | B1 | 3/2004 | Warrier et al. |
| 6,742,036 | B1 | 5/2004 | Das et al. .................... 709/226 |
| 6,760,444 | B1 | 7/2004 | Leung ....................... 380/270 |
| 6,763,007 | B1 | 7/2004 | La Porta et al. |
| 6,795,857 | B1 | 9/2004 | Leung et al. ................ 709/224 |
| 6,810,259 | B1 | 10/2004 | Zhang |
| 6,947,401 | B2 | 9/2005 | El-Malki et al. |
| 6,973,068 | B2 | 12/2005 | Inoue et al. |
| 6,982,967 | B1 | 1/2006 | Leung |
| 6,996,084 | B2 | 2/2006 | Troxel et al. |
| 7,068,640 | B2 | 6/2006 | Kakemizu et al. |
| 7,079,499 | B1 | 7/2006 | Akhtar et al. |
| 7,079,520 | B2 | 7/2006 | Feige et al. |
| 7,080,151 | B1 | 7/2006 | Borella et al. |
| 7,130,629 | B1 | 10/2006 | Leung et al. |
| 7,152,238 | B1 | 12/2006 | Leung et al. |
| 7,161,913 | B2 | 1/2007 | Jung |
| 7,170,892 | B2 | 1/2007 | Major |
| 7,260,638 | B2 | 8/2007 | Crosbie |
| 2001/0005369 | A1 * | 6/2001 | Kloth ......................... 370/392 |
| 2001/0036184 | A1 | 11/2001 | Kinoshita et al. |
| 2002/0026527 | A1 | 2/2002 | Das et al. .................... 709/245 |
| 2002/0075866 | A1 | 6/2002 | Troxel et al. |
| 2002/0078238 | A1 | 6/2002 | Troxel et al. |
| 2002/0147837 | A1 | 10/2002 | Heller |
| 2003/0021275 | A1 | 1/2003 | Shabeer |
| 2003/0212794 | A1 | 11/2003 | Touati et al. |
| 2004/0001513 | A1 | 1/2004 | Major et al. |
| 2004/0024901 | A1 | 2/2004 | Agrawal et al. ............. 709/238 |
| 2004/0081086 | A1 | 4/2004 | Hippelainen et al. |
| 2004/0103282 | A1 * | 5/2004 | Meier et al. ................. 713/171 |
| 2004/0109452 | A1 | 6/2004 | Takihiro et al. |
| 2004/0114559 | A1 | 6/2004 | Wang |
| 2004/0172480 | A1 * | 9/2004 | Hirose et al. ................ 709/238 |
| 2004/0208187 | A1 | 10/2004 | Mizell et al. |
| 2004/0213172 | A1 | 10/2004 | Myers et al. |
| 2004/0213260 | A1 | 10/2004 | Leung |
| 2006/0203804 | A1 | 9/2006 | Whitmore et al. |

FOREIGN PATENT DOCUMENTS

| | | |
|---|---|---|
| EP | 0978977 A1 | 2/2000 |
| EP | 1124396 A2 | 8/2001 |

OTHER PUBLICATIONS

Charles Perkins, "Mobile IP Design Principles and Practices", Addison Wesley, 1998, pp. 50, 55-59, 83, 78.

U.S. Office Action dated Jun. 2, 2006 from related U.S. Appl. No. 10/080,995, 15 pgs.

U.S. Office Action dated Nov. 24, 2006 from related U.S. Appl. No. 10/080,995, 10 pgs.

U.S. Office Action dated Feb. 9, 2007 from related U.S. Appl. No. 10/080,995, 13 pgs.

U.S. Office Action dated Jul. 19, 2007 from related U.S. Appl. No. 10/080,995, 9 pgs.

U.S. Office Action dated Dec. 15, 2006 from related U.S. Appl. No. 10/321,080, 11 pgs.

U.S. Office Action dated Jul. 3, 2007 from related U.S. Appl. No. 10/321,080, 11 pgs.

U.S. Office Action mailed Jan. 25, 2007 from related U.S. Appl. No. 10/354,690, 26 pgs.

U.S. Office Action mailed Jul. 3, 2007 from related U.S. Appl. No. 10/354,690, 18 pgs.

Mobile Networking Through Mobile IP, Perkins, IEEE 1998.

U.S. Office Action dated Apr. 17, 2007 from related U.S. Appl. No. 10/426,106, 9 pgs.

U.S. Office Action dated Jun. 15, 2007 from related U.S. Appl. No. 10/426,106, 13 pgs.

R. Droms, *"Dynamic Host Configuration Protocol"*, RFC 2131, Mar. 1997, pp. 1-39.

T. Li, et al *"Cisco Hot Standby Router Protocol (HSRP),"* Mar. 1998, Network Working Group RFC 2281 (http://ftp.ietf.org/rfc/rfc2281.txt?number=2281).

Release notes for 3Com Corporation, *"Conducting a Redundant Route for Network Resiliency"*, Mar. 1994, NET Builder Family Bridge/Router, pp. 26-29.

J. Moy, *"OSPF Version 2"*, RFC 1247, Jul. 19, 1991.

D. Oram, *"OSI IS-IS Intra-domain Routing Protocol"*, RFC 1142, Feb. 1990.

Uyless Black, *"TCP/IP and Related Protocols"*, 1992, *McGraw-Hill, Inc.*, pp. 226-249.

Chambless, et al., *"Home Agent Rebundancy Protocol (HARP)"*, Oct. 27, 1997.

C. Perkins, *"IP Mobility Support"*, Networking Working Group, RFC 2002 Oct. 1996.

Helmy et al., "*Efficient Micro-Mobility using Intra-Domain Multicast-Based Mechanisms (M&M)*", ACM SIGCOMM Computer Communications Review, vol. 32, No. 5: Nov. 2002, pp. 61-72, XP-002279254.

B. Aboba, et al., "*The Network Access Identifier*", Network Working Group, RFC 2486, Jan. 1999.

"*Mobile IP*", Release 12.0(1)T, pp. 1-55 on or before Jul. 25, 2002.

G. Montenegro, "*Reverse Tunneling for Mobile IP*", RFC 2344, Sun Microsystems, Inc., pp. 1-19, May 1998.

D. Harkins and D. Carrel, "*The Internet Key Exchange (IKE)*", Cisco Systems, pp. 1-33, Jun. 1998.

D. Cong and M. Hamlen and C. Perkins, "*The Definitions of Managed Objects for IP Mobility Support using SMIv2*", RFC 2006, Motorola and IBM, pp. 1-52, Oct. 1996.

C. Finseth, "*An Access Control Protocol, Sometimes Called TACACS*", RFC 1492, pp. 1-15, Sep. 13, 1992.

D. Carrel and Lol Grant, "*The TACACS+Protocol*", Network Working Group, Internet-Draft, Cisco Systems, pp. 1-42, Jan. 1997.

C. Rigney, "*Radius Accounting*", RFC 2139, Livingston, pp. 1-25, Apr. 1997.

C. Rigney, et al., "*Remote Authentication Dial in User Service (RADIUS)*", RFC 2138, pp. 1-65, Apr. 1997.

Perkins & Hobby, "*The Point-to-Point Protocol (PPP) Intial Configuration Options,*" Network Working Group, RFC 1172 Jul. 1990.

W. Simpson, *PPP Challenge Handshake Authenitication Protocol (CHAP)*, Network Working Group, RFC 1994 Aug. 1996.

Lloyd, et al., "*PPP Authentication Protocols*", Network Working Group, RFC 1334, Oct. 1992.

McGregor, "*The PPP Internet Protocol Control Protocol (IPCP)*" Network Working Group, RFC 1332, May 1992.

Simpson, ed., "*The Point-to-Point Protocol (PPP)*" Network Working Group, RFC 1661, Jul. 1994.

Calhoun and Perkins, "*Mobile IP Network Access Identifier Extensions for IPv4*", Jan. 12, 2000.

J. Postel, "*Simple Mail Transfer Protocol*", STD 10, RFC 821, Aug. 1982.

D. Crocker and P. Overrell, *"Augmented BNF For Syntax Sepcifiications: ABNF"*, RFC 2234, Nov. 1997.

*International Search Report PCT/US 03/38568*, 4 pp., mailed May 21, 2004.

*International Search Report PCT/US2004/013365*, 7 pp., mailed Oct. 5, 2004.

U.S. Office Action dated Nov. 8, 2007 form related U.S. Appl. No. 10/080,995, 9 pgs.

Notice of Allowance and Allowed Claims dated Nov. 29, 2007 from U.S. Appl. No. 10/354,690, 16 pgs.

U.S. Office Action dated Dec. 12, 2007 from related U.S. Appl. No. 10/321,080, 10 pgs.

U.S. Office Action dated Dec. 12, 2007 from related U.S. Appl. No. 10/426,106, 12 pgs.

\* cited by examiner

METHODS AND APPARATUS FOR SUPPORTING MOBILE IP PROXY REGISTRATION IN A SYSTEM IMPLEMENTING MULITPLE VLANS

BACKGROUND OF THE INVENTION

The present invention relates to Mobile IP network technology. More specifically, this invention relates to mechanisms for supporting proxy registration in a Mobile IP environment in which multiple virtual LANs are supported.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
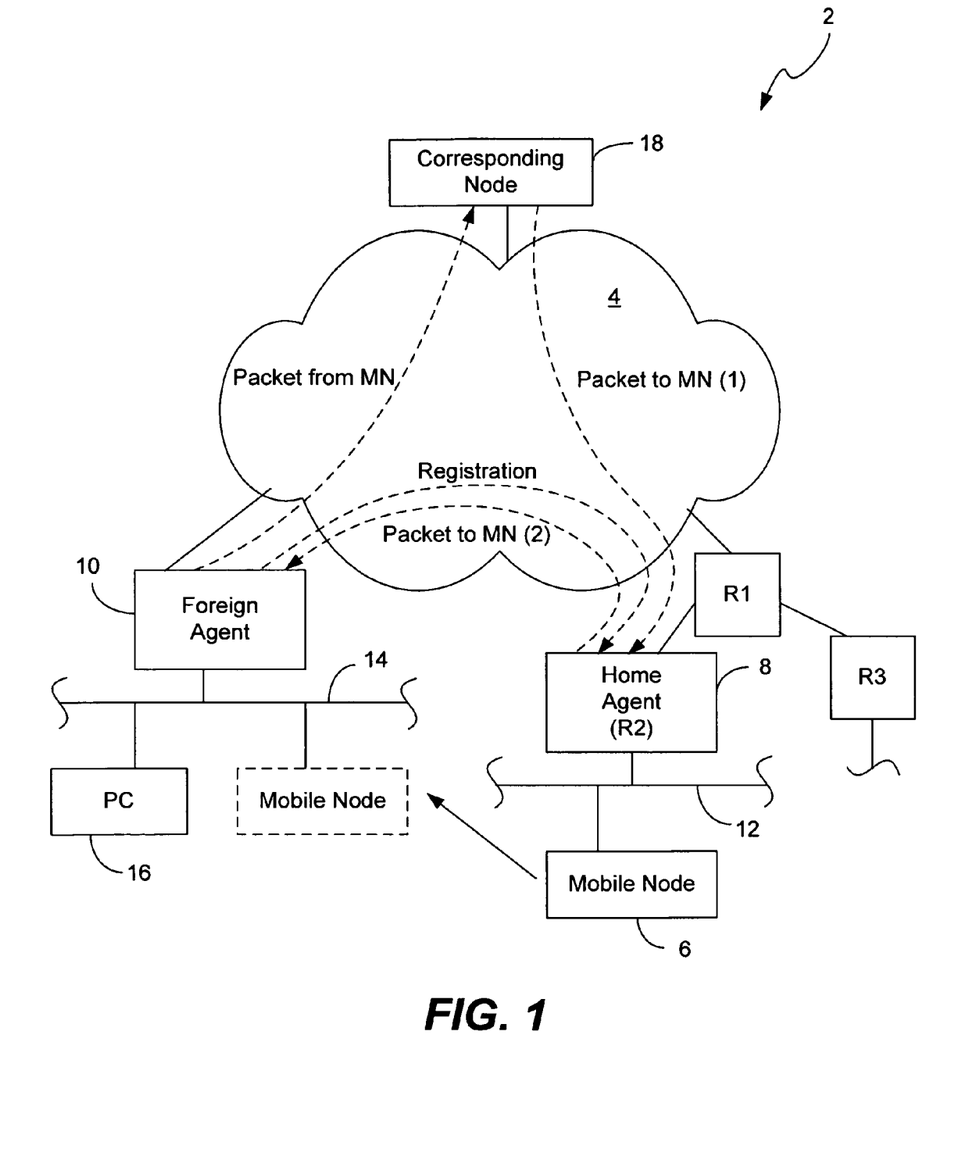
FIG. 1 is a diagram of a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to Corresponding Node 18 (as indicated by the dotted line "packet from MN") according to a standard internet protocol. If Corresponding Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Corresponding Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

Unfortunately, some nodes are not configured with Mobile IP software. Since a node may not support Mobile IP, a node that changes its location within a network cannot initiate registration with its Home Agent nor can it learn about the Foreign Agent. In order to overcome the limitation of the lack of Mobile IP client software, proxy Mobile IP support (i.e., proxy registration) may be performed on behalf of the node. When proxy Mobile IP is implemented, registration is performed by a proxy node on behalf of the node.

Proxy Mobile IP has been implemented in routers such as Foreign Agents and Access Points. An Access Point (AP) is the center point in an all-wireless network or serves as a connection point between a wired and a wireless network. Multiple APs can be placed throughout a facility to give users with WLAN adapters the ability to roam freely throughout an extended area while maintaining uninterrupted access to all network resources. Once a node is registered with a Home Agent, packets may be forwarded by the Home Agent to the Foreign Agent. Moreover, the Access Point may also redirect packets sent by the node to the Foreign Agent, enabling the redirected packets to be sent to the appropriate destination by the Foreign Agent. Patent application Ser. No. 10/080,995, CISCP263, entitled "METHODS AND APPARATUS FOR SUPPORTING PROXY MOBILE IP REGISTRATION IN A WIRELESS LOCAL AREA NETWORK," filed on Feb. 20, 2002, by inventors Wang et al, which discloses a method of supporting proxy registration by an Access Point, is incorporated by reference for all purposes.

Various mechanisms have been implemented for performing proxy registration by a Foreign Agent or Access Point. For instance, patent application Ser. No. 09/333,831, entitled "METHODS AND APPARATUS FOR PROVIDING MOBILITY OF A NODE THAT DOES NOT SUPPORT MOBILITY," filed on Jun. 15, 1999, by Leung, et al, discloses a method of performing proxy registration on behalf of a node in a Foreign Agent. Patent application Ser. No. 09/751,944, entitled "ENABLING MOBILITY FOR POINT TO POINT PROTOCOL (PPP) USERS USING A NODE THAT DOES NOT SUPPORT MOBILITY," filed on Dec. 29, 2000, by Leung et al, also discloses a method of performing proxy registration by a Foreign Agent. In addition, patent application Ser. No. 09/608,692, entitled "METHODS AND APPARATUS FOR IMPLEMENTING A PROXY MOBILE NODE IN A WIRELESS LOCAL AREA NETWORK," filed on Jun. 29, 2000, by Kent Leung, discloses a system for supporting mobility for a node that changes its location within a network through the use of control messages that are sent between a Foreign Agent and an Access Point. These applications are incorporated herein by reference for all purposes.

Previously, a Virtual Local Area Network (VLAN) could not be configured on a device such as an Access Point. With the advent of VLAN technology, VLANs can be configured on a device such as an Access Point. Specifically, a VLAN may configured on each of the device interfaces. However, Mobile IP may not be configured on each of the interfaces.

In view of the above, it would be beneficial if proxy Mobile IP could be implemented in a device supporting VLANs. Moreover, it would be desirable if proxy Mobile IP could be implemented without requiring proxy Mobile IP to be configured on all of the VLAN interfaces.

SUMMARY OF THE INVENTION

Methods and apparatus for implementing proxy Mobile IP registration in a system implementing multiple VLANs are disclosed. This is accomplished via a network device such as an Access Point or Foreign Agent that supports multiple VLANs on a plurality of its interfaces. Registration request and reply messages are sent in-band or out-of-band to establish a data path via the appropriate VLAN interface of the network device. In this manner, proxy registration on behalf of a node is established.

In accordance with one aspect of the invention, the network device implements proxy Mobile IP on at least one interface. The network device ascertains a subnet map of a node, where the subnet map corresponds to a VLAN. It then identifies a Home Agent associated with the subnet map or VLAN via which to register the node. The network device then composes a registration request on behalf of the node, where the registration request identifies the node (e.g., IP address) and includes a Home Agent address associated with the Home Agent. The registration request also directly or indirectly indicates the interface corresponding to the VLAN via which data packets are to be routed. The registration request is then sent on behalf of the node. A registration reply that indicates success or failure of the proxy registration performed on behalf of the node is then received.

In accordance with another aspect of the invention, a subnet map of the node is ascertained. In addition, a VLAN associated with the subnet map is identified such that one of the plurality of interfaces supporting the VLAN is identified. A Home Agent associated with the subnet map or the VLAN via which to register the node may then be identified. The network device composes a registration request on behalf of the node, where the registration request identifies the node and includes a Home Agent address associated with the Home Agent. In addition, the registration request indicates (explicitly or implicitly) the one of the plurality of interfaces supporting the VLAN via which data packets are to be routed. The registration request is then sent on behalf of the node. A registration reply indicating success or failure of the proxy registration performed on behalf of the node is then received.

In accordance with yet another aspect of the invention, registration request and reply packets may be sent in-band or out-of-band. Messages that are sent in-band are sent on the interface associated with the appropriate VLAN (e.g., that associated with the node for which the registration is being performed), while messages that are sent out-of-band are sent on an interface that is not associated with the VLAN. For instance, the interface may be that associated with another VLAN or may be the native VLAN. Out-of-band messaging may be desired, for example, when the VLAN interface does not support Mobile IP. It may be desirable, for instance, to only configure Mobile IP software on the native VLAN. When out-of-band messaging is performed, an indicator of the pertinent VLAN may be designated in the registration request message, as well as the registration reply message. Through the use of in-band or out-of-band messaging, proxy registration may be accomplished.

In accordance with embodiments of the invention, VLANs may be configured on one or more interfaces of the network device (e.g., router), without requiring Mobile IP to be configured on each of the interfaces. Accordingly, through the disclosed messaging schemes and formats, proxy registration may be performed to support messaging in a multiple VLAN environment. Upon successful proxy registration, data packets may be transmitted on the appropriate VLAN interface of the network device.

In accordance with another aspect of the invention, the invention pertains to a system operable to perform and/or initiate proxy registration on behalf of a node in a system supporting multiple VLANs. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of the invention support proxy Mobile IP in a system implementing multiple VLANs. In the following description, embodiments of the invention support registration of a node via a proxy node such as an Access Point that supports multiple VLANs. It is assumed that at least one of the interfaces of the Access Point supports Mobile IP. Thus, one or more interfaces of the Access Point support Mobile IP. While all of the interfaces of the Access Point may support Mobile IP, this is not required. Registration of the node may be accomplished via in-band signaling or out-of-band signaling.

In-band signaling involves sending a registration request and/or reply packet on the interface associated with the VLAN (i.e., VLAN interface). Out-of-band signaling involves sending a registration request and/or reply packet on an interface that is not associated with the VLAN. For instance, the interface may be the native VLAN on which none of the VLANs are configured.

Figure 2:
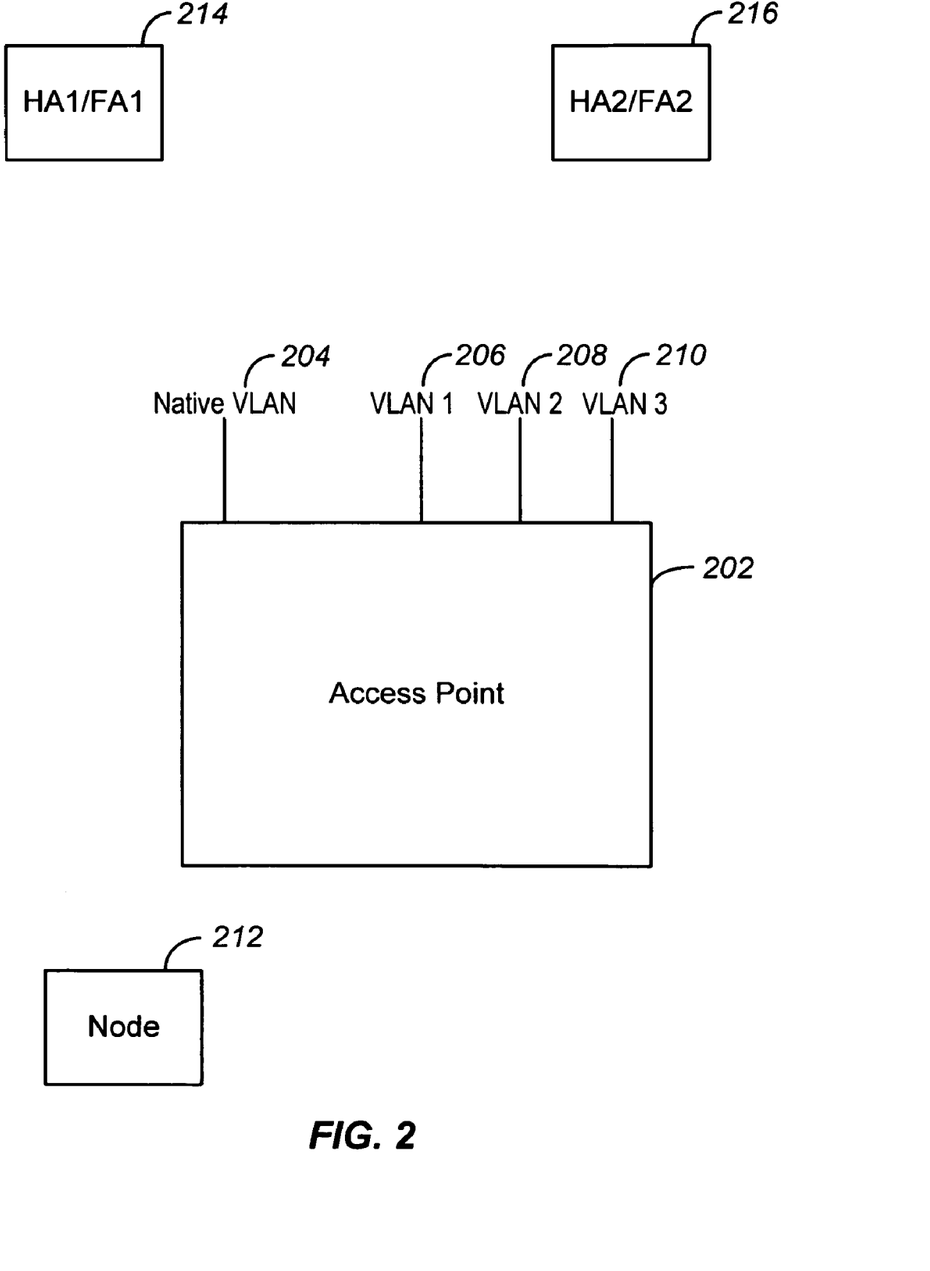
FIG. 2 is a diagram illustrating an exemplary Access Point on which the present invention may be implemented.

Proxy registration may be performed on behalf of a node by a network device supporting Mobile IP such as an Access Point or Foreign Agent. FIG. 2 is a diagram illustrating an exemplary Access Point on which the present invention may be implemented. As shown in FIG. 2, an Access Point 202 includes a plurality of interfaces supporting a plurality of VLANs. In this example, the Access Point 202 includes an interface 204 associated with the native VLAN, as well as interfaces 206, 208, 210 corresponding to VLANs VLAN1, VLAN2, and VLAN3, respectively.

The Access Point functions as a proxy node to perform proxy registration on behalf of a node 212. In order to perform proxy registration on behalf of the node 212, the Access Point needs to identify a Home Agent via which to register the node 212. In addition, the Access Point may also identify an appropriate Foreign Agent. In this example, the Home Agent and Foreign Agent are implemented in a single network device. Specifically, a first network device 214 supports a first Home Agent, HA1, and a first Foreign Agent, FA1. Similarly, a second network device 216 supports a second Home Agent, HA1, and a second Foreign Agent, FA2. However, this example is merely illustrative, and the Home Agent and Foreign Agent may be implemented in separate network devices (e.g., routers).

Once proxy registration has been completed, packets may be sent on the appropriate VLAN. Thus, data packets may be forwarded to the node or received from the node on the appropriate VLAN interface of the Access Point.

Figure 3:
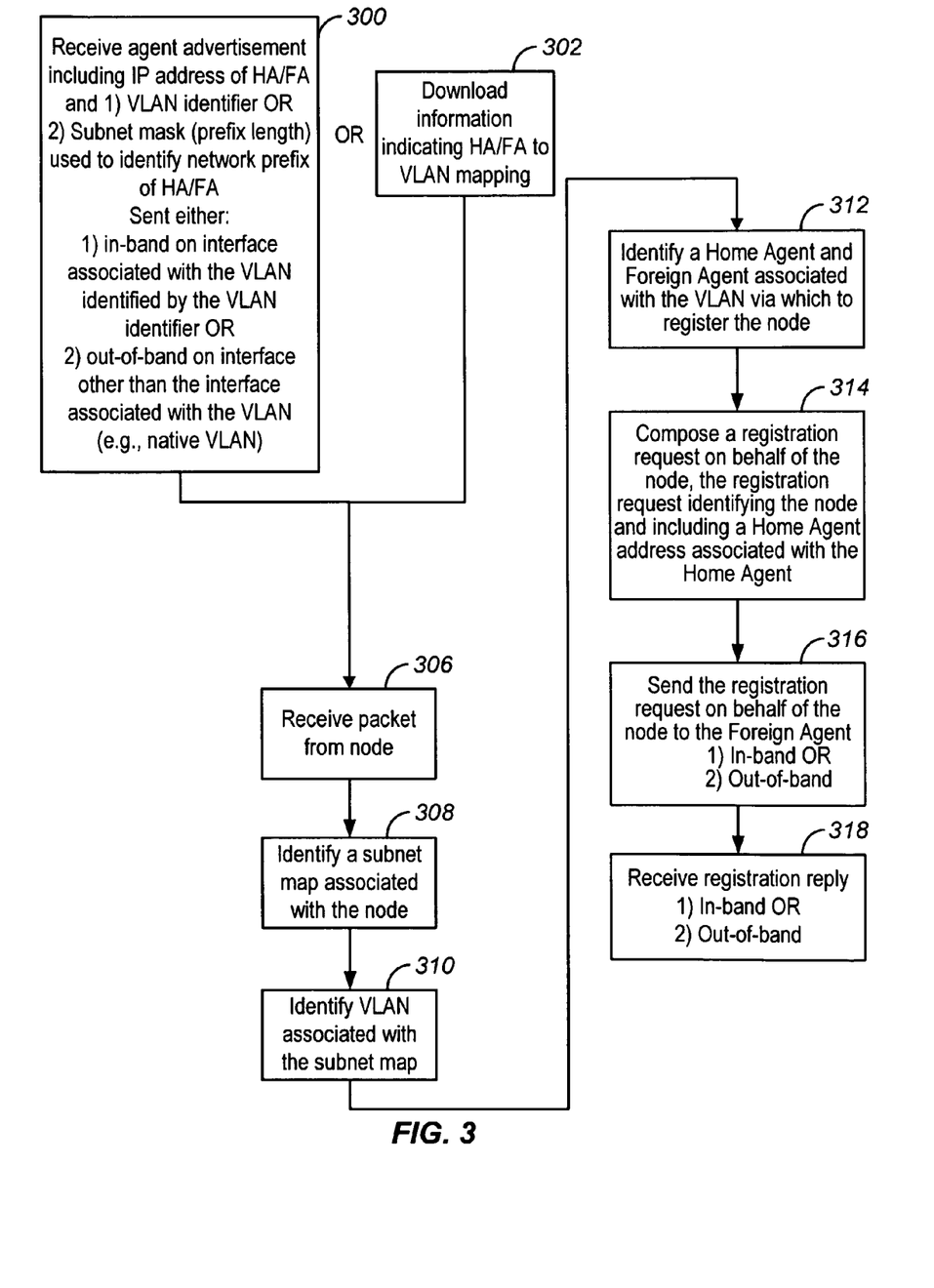
FIG. 3 is a diagram illustrating a process flow diagram illustrating a method of implementing the present invention.

FIG. 3 is a diagram illustrating a process flow diagram illustrating a method of implementing the present invention. Generally, the Access Point must be able to identify the appropriate Home Agent via which to register the node. In addition, the Access Point may also identify the pertinent Foreign Agent that should receive the registration request from the Access Point. In order to make these determinations, the Access Point collects the pertinent information (e.g., subnet and/or VLAN associations) for one or more Home Agents and/or Foreign Agents.

There are a variety of ways in which subnet and/or VLAN associations may be obtained. First, agent advertisements may be transmitted by Home Agents, as well as Foreign Agents. As shown at block 300, the Access Point may receive an agent advertisement from at least one of the Home Agent and the Foreign Agent. Generally, an agent advertisement transmitted by a Foreign Agent or Home Agent includes its address. For instance, the Foreign Agent generally advertises its address (generally referred to as a care-of address). In addition, in accordance with one embodiment, the agent advertisement either explicitly or implicitly identifies a VLAN. Thus, the Home Agents and/or Foreign Agents are configured with additional information such as a subnet mask (i.e., prefix length) and/or a mechanism for identifying its VLAN. For instance, the Home Agents and/or Foreign Agents may be configured with a VLAN identifier, or may be configured with a mapping between one or more network prefixes and one or more VLANs that enables the Home Agent/Foreign Agent to identify a VLAN from a network prefix.

Thus, the agent advertisement may further include a subnet mask (i.e., prefix length) that may be used to identify the network prefix of the Foreign Agent or Home Agent. In order to send this information, the subnet mask is configured on the Home Agent and/or Foreign Agent. Alternatively, the agent advertisement may include a VLAN identifier (e.g., tag), which may be provided in an extension to the agent advertisement.

The agent advertisements may be sent in-band or out-of-band. Specifically, the agent advertisements may be sent in-band by sending the advertisement on the corresponding VLAN (e.g., identified by the VLAN identifier or corresponding to a network prefix). Alternatively, the agent advertisements may be transmitted out-of-band on an interface other than the VLAN interface associated with the VLAN. For instance, the agent advertisements may be received on the native VLAN interface.

For agent advertisements that are transmitted out-of-band, the agent advertisement identifies the VLAN explicitly, such as via a VLAN identifier. However, for in-band agent advertisements, the agent advertisement need not identify the VLAN since the VLAN is identified implicitly, since it is sent on the VLAN interface. Of course, the agent advertisement may identify the VLAN in either instance, but this is not required.

Second, rather than sending agent advertisements, information may be obtained from a central server. For instance, information indicating one or more Home Agent/Foreign Agent to VLAN mappings may be downloaded from a server as shown at block 302. As one example, VLAN to network prefix mappings may be downloaded from the server. The mapping(s) may then be stored at the network device. Alternatively, these mappings may be configured at the network device.

In accordance with one embodiment, the centralized server provides authentication services and/or authorization services. While authentication determines "who" an entity is, authorization determines what services a user is allowed to perform, or access. Thus, a class of servers known as "AAA" or triple-A servers may be employed. The AAA represents authentication, authorization, and accounting. Various protocols such as the Remote Authentication Dial In User Service (RADIUS) and TACACS+ may be implemented to provide such a server. Note that the Home Agent or Foreign Agent providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

In addition to obtaining information, the Access Point may also transmit information. This information (e.g., implicit or explicit VLAN identification) may be provided in a registration request packet, as will be described in further detail below. Alternatively, the information may transmitted in a message such as an advertisement by the Access Point. For instance, the message may associate one or more of the plurality of VLANs with one or more of the plurality of interfaces of the network device. Thus, the message may be sent on one of the interfaces and identify a VLAN, thereby associating the interface with the VLAN.

In order to send a registration request on behalf of the node, the Access Point needs the node's IP address and Home Agent address (i.e., default gateway) in order to compose a registration request packet. In addition, the Access Point also ascertain's the node's sub-network network mask (i.e., netmask) in order to ascertain whether Mobile IP proxy services are required. Specifically, when the Access Point determines from the source address of a data packet and the netmask that the node is located on the subnet identical to the subnet of the Access Point, no Mobile IP service is required on behalf of the node as shown at block. However, when the Access Point determines from the source address that the node is not located on the subnet of the Access Point, proxy Mobile EP service is performed by the Access Point is performed on behalf of the node.

Thus, the Access Point ascertains a subnet map associated with the node. For instance, a packet may be received from the node at block 306. The packet may be a data packet or other packet transmitted by the node. A subnet map associated with the node may then be identified from the packet at block 308. Specifically, a subnet mask may be applied to the source IP address, thereby enabling a network prefix (i.e., subnet map) to be identified. The identification of the subnet mask to be applied to the node may be ascertained via inter-proxy communication as disclosed in patent application Ser. No. 10,321, 080, entitled "INTER-PROXY COMMUNICATION PROTOCOL FOR MOBILE IP," filed on Dec. 16, 2002, by Huizhao Wang, which is incorporated herein by reference for all purposes. The network prefix of the node may then be used to identify a corresponding VLAN, or may simply be matched to the network prefix of Home Agents in order to identify a Home Agent corresponding to the VLAN of the node.

A Home Agent via which to register the node is then identified. For instance, a Home Agent having a subnet map that matches the subnet map of the node may be identified. As another example, the VLAN associated with the subnet map of the node may be identified at block 310, which may be used to identify a Home Agent. Moreover, identification of the relevant VLAN enables an interface supporting the VLAN to be identified. Thus, a Home Agent (and Foreign Agent) associated with that VLAN (or subnet map) may then be selected at block 312 from a set of mapping information that maps Home Agents/Foreign Agents to VLANs. For instance, the Access Point may search a list of a plurality of VLANs, where each of the VLANs is associated with at least a Home Agent and/or Foreign Agent.

The Access Point then composes a registration request on behalf of the node at block 314. The registration request identifies the node (e.g., IP address) and includes a Home Agent address associated with the Home Agent. In addition, the registration request indicates, either explicitly or implicitly, the interface of the Access Point corresponding to the VLAN via which data packets are to be routed, as will be described in further detail below. The registration request is then sent on behalf of the node at block 316. As one example, the Access Point sends the registration request to the Foreign Agent identified above.

When the Foreign Agent receives the registration request, the registration request identifies an interface address of the Access Point associated with the VLAN and/or a VLAN identifier identifying the VLAN of the Access Point. The Foreign Agent processes the registration request and forwards it to the Home Agent, which generates a registration reply and upon successful registration, generates a binding between the node and the Foreign Agent care-of address. The Home Agent forwards the registration reply to the Foreign Agent, which upon notification of a successful proxy registration, generates a binding between the node and the VLAN interface of the Access Point. A registration reply is then sent by the Home Agent to the Foreign Agent, which forwards the registration reply to the Access Point.

The Access Point then receives a registration reply at block 318 that indicates the success or failure of the proxy registration performed on behalf of the node. When the registration is successful, packets can thereafter be sent on the interface associated with the vLAN.

Both the registration request and registration reply may be sent in-band or out-of-band. Specifically, the registration request and/or reply message(s) may be sent in-band by sending the message on the corresponding VLAN (e.g., identified by the VLAN identifier or corresponding to a network prefix). Alternatively, the message(s) may be transmitted out-of band on an interface other than the VLAN interface associated with the VLAN. For instance, the message(s) may be received/ transmitted on the native VLAN interface.

For messages that are sent in-band, the VLAN is identified implicitly. As a result, when a registration request and/or registration reply are sent in-band, the registration request and/or reply messages need not identify the VLAN. Thus, the registration request/reply messages may include a VLAN identifier, but this is not required. For messages that are sent out-of-band, the VLAN is identified explicitly. For instance, a VLAN identifier may be provided in an extension to the registration request and/or reply packets. Exemplary registration request and reply messages will be described in further detail below with reference to FIGS. 4A-B and 5A-B.

Figure 4A:
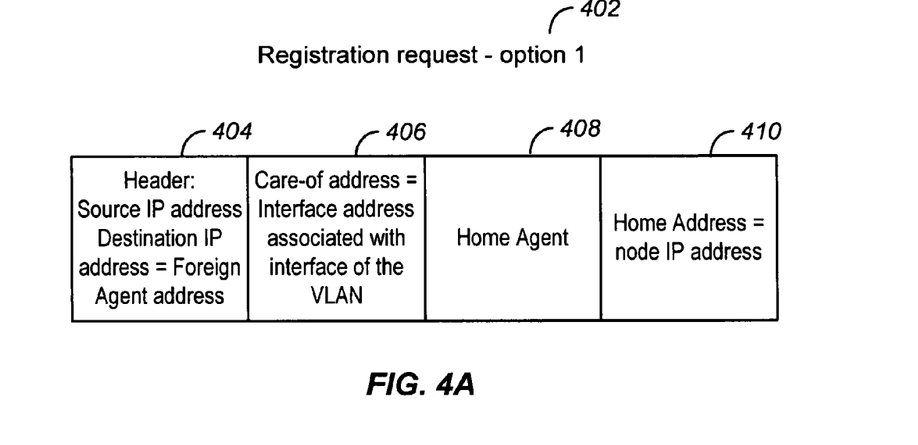
FIGS. 4A and 4B each illustrate an exemplary registration request that may be composed and transmitted by the Access Point in accordance with one embodiment of the invention.

FIGS. 4A and 4B each illustrate an exemplary registration request that may be composed and transmitted by the Access Point in accordance with one embodiment of the invention. As shown in FIG. 4A, a registration request packet 402 includes a header 404 that includes both the source IP address and destination IP address. As described above, the destination IP address may be that of the Foreign Agent. In addition, since the registration is a proxy registration, the care-of address field 406 of the registration request packet 402 identifies the IP address of the appropriate VLAN interface. The registration request packet further includes a Home Agent address 408 and an IP address of the node that is provided in the Home Address field 410 of the registration request packet 402. The registration request packet illustrated in FIG. 4A does not explicitly identify a VLAN. Accordingly, the registration request packet of FIG. 4A may be transmitted in-band on the pertinent VLAN interface.

Figure 4B:
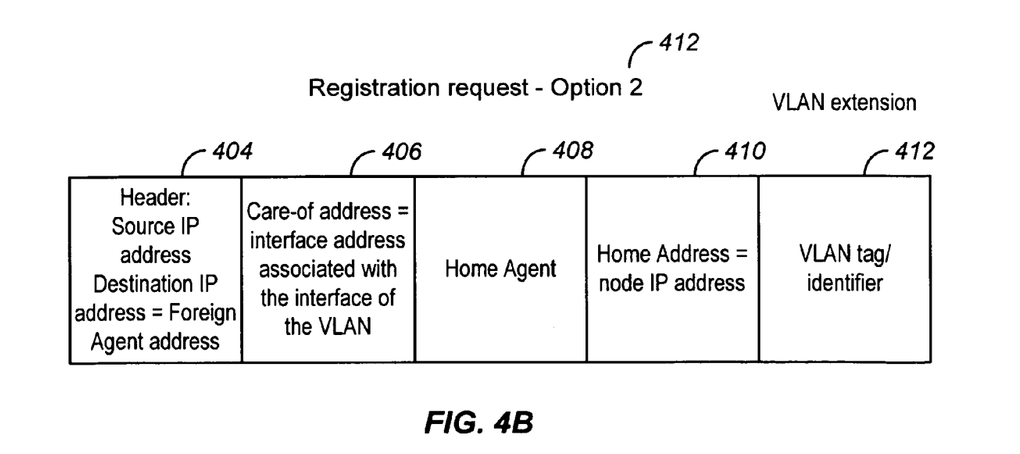

FIG. 4B illustrates another exemplary registration request packet that may be transmitted out-of-band on an interface that is not the VLAN interface. This registration request packet may also be transmitted in-band. However, the additional VLAN information need not be provided in the registration request packet in these situations, since the identity of the VLAN is implicit in the interface that is selected.

As shown in FIG. 4B, the information provided in the registration request packet of FIG. 4A is also provided in the registration request packet of FIG. 4B. In addition, the registration request packet identifies the VLAN on which data packets are to be transmitted. This may be accomplished by identifying the VLAN in an extension 412 to the registration request. Alternatively, the registration request packet may simply include an indicator indicating that a field such as the care-of address field includes the IP address associated with the VLAN. From this information, a Home Agent or Foreign Agent may identify the corresponding VLAN. This embodiment would require that the Home Agent and/or Foreign Agent either store or have access to a mapping between one or more VLANs and one or more network prefixes or IP addresses. Thus, the registration request identifies an interface of the network device corresponding to the pertinent VLAN (enabling the receiver to identify the VLAN from the information provided in the registration request packet) and/or explicitly identifies the VLAN, as described above. The VLAN may also be identified, as described above. Accordingly, the registration request includes an address associated with the interface via which data packets are to be routed and/or a VLAN identifier identifying the VLAN via which data packets are to be routed.

Figure 5A:
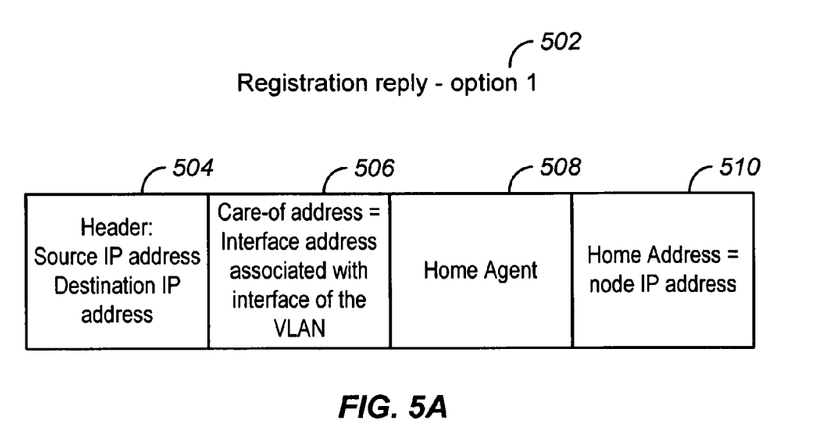
FIGS. 5A and 5B illustrate an exemplary registration reply that may be received by the Access Point in accordance with one embodiment of the invention.

FIGS. 5A and 5B each illustrate an exemplary registration reply that may be received by the Access Point in accordance with one embodiment of the invention. As shown in FIG. 5A, a registration reply packet 502 includes a header 504 that includes both the source IP address and destination IP address. As described above, the destination IP address may be that of the Mobile Node. In addition, since the registration is a proxy registration, a field such as the care-of address field 506 of the registration reply packet 502 identifies the IP address of the appropriate VLAN interface. The registration reply packet further includes a Home Agent address 508 and an IP address of the node that is provided in the Home Address field 510 of the registration reply packet 502. The registration reply packet illustrated in FIG. 5A does not explicitly identify a VLAN. Accordingly, the registration reply packet of FIG. 5A may be transmitted in-band on the pertinent VLAN interface.

Figure 5B:
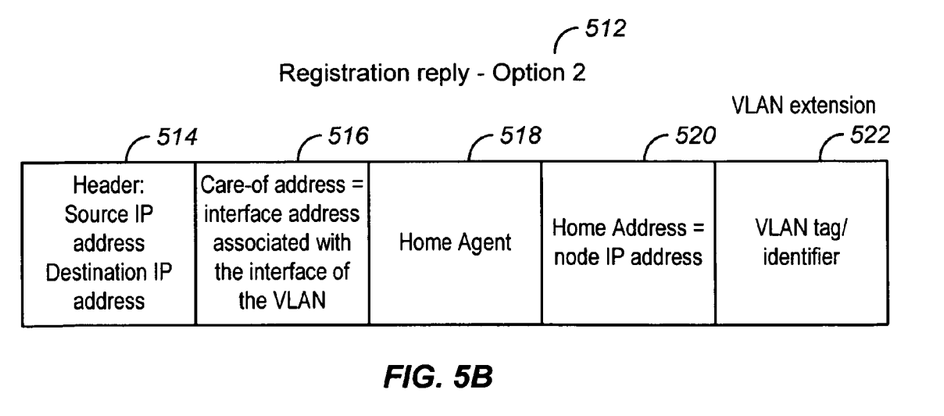

FIG. 5B illustrates another exemplary registration reply packet that may be transmitted out-of-band on an interface that is not the VLAN interface. This registration reply packet may also be transmitted in-band. However, the additional VLAN information need not be provided in the registration reply packet in these situations, since the identity of the VLAN is implicit in the interface that is selected.

As shown in FIG. 5B, the information provided in the registration reply packet of FIG. 5A is also provided in the registration reply packet of FIG. 5B. In addition, the registration reply packet identifies the VLAN on which data packets are to be transmitted. This may be accomplished by identifying the VLAN in an extension 512 to the registration reply. Alternatively, the registration reply packet may simply include an indicator indicating that a field such as the care-of address field includes the IP address associated with the VLAN. From this information, a Home Agent or Foreign Agent may identify the corresponding VLAN. This embodiment would require that the Home Agent and/or Foreign Agent either store or have access to a mapping between one or more VLANs and one or more network prefixes or IP addresses. Thus, the registration reply identifies an interface of the network device corresponding to the pertinent VLAN (enabling the receiver to identify the VLAN from the information provided in the registration reply packet) and/or explicitly identifies the VLAN, as described above. The VLAN may also be identified, as described above. Accordingly, the registration reply identifies the VLAN and/or an interface address associated with the VLAN.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Access Point, Home Agent, or Foreign Agent) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Access Points or Home and Foreign Agents of this invention may be specially configured routers such as specially configured router models 2500, 2600, 3600, 4000, 4500, 4700, 7200, and 7500 available from Cisco Systems, Inc. of San Jose, Calif. In addition, in a preferred embodiment, any of the Access Points of this invention may be specially configured routers such as specially configured router models 350, 1100, 1200 and 1400 available from Cisco Systems, Inc. of San Jose, Calif. Moreover, in a preferred embodiment, the Mobile Router of this invention may be a specially configured router such as specially configured router model 3200 available from Cisco Systems, Inc. of San Jose, Calif. A general structure for some of these machines will appear from the description given below.

Generally, the proxy registration techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid proxy registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the proxy registration system may be implemented on a general-purpose network host machine such as a personal computer or workstation. Further, the invention may be at least partially implemented on a card (e.g., an interface card) for a network device or a general-purpose computing device.

Figure 6:
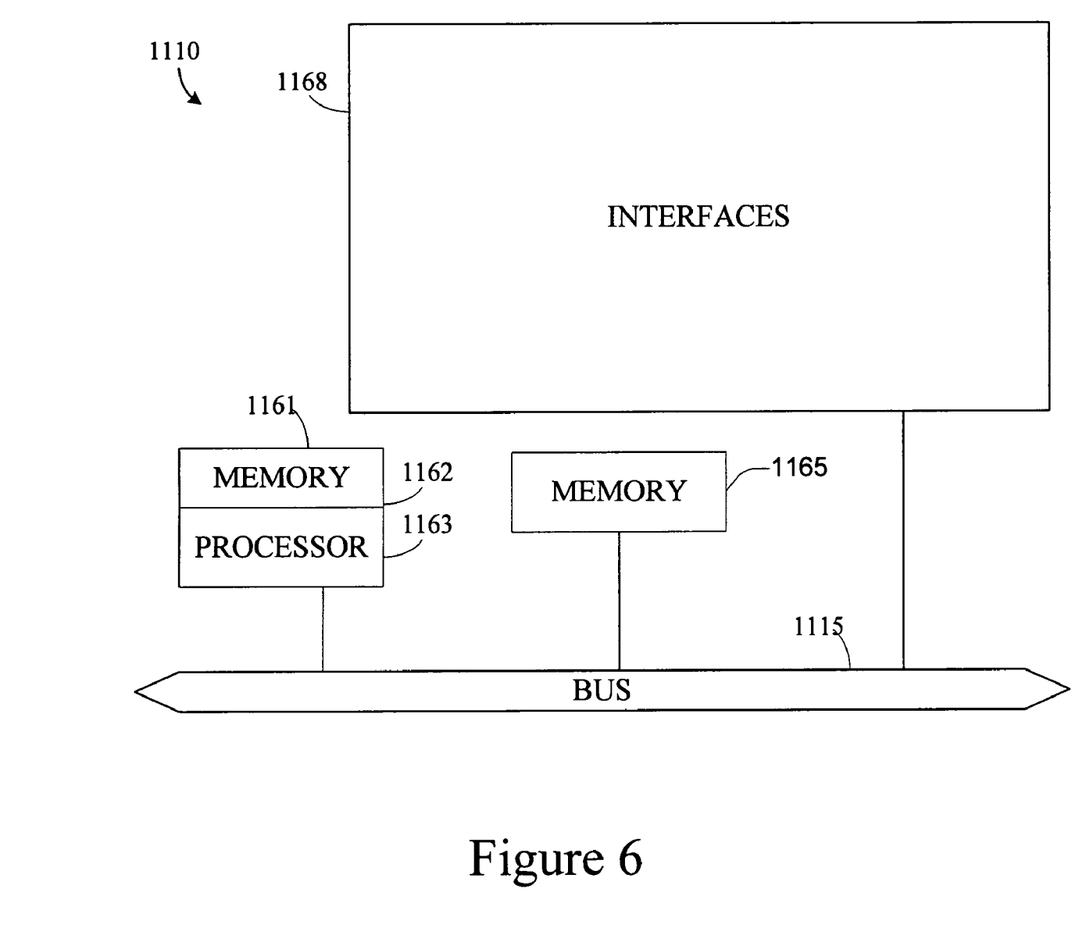
FIG. 6 is a diagrammatic representation of a router in which embodiments of the present invention may be implemented.

Referring now to FIG. 6, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, mapping tables etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for roaming, proxy registration and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats are merely illustrative, and therefore other messages may be used to establish proxy registration on behalf of a node. Therefore, the described embodiments should be taken as illustrative and not restrictive, and the invention should not be limited to the details given herein but should be defined by the following claims and their full scope of equivalents.

What is claimed is:

1. In a network device supporting Mobile Internet Protocol (Mobile IP), the network device having a plurality of interfaces supporting a plurality of virtual local area network(s) (VLAN or VLANs), a method of performing proxy registration on behalf of a node, the method comprising:
    ascertaining a subnet map of the node, the subnet map corresponding to one of the plurality of VLANs;
    identifying a Home Agent associated with the subnet map or the VLAN via which to register the node;
    composing a registration request on behalf of the node, the registration request identifying the node and including a Home Agent address associated with the Home Agent, the registration request indicating one of the plurality of interfaces corresponding to the one of the plurality of VLANs via which data packets are to be routed; sending the registration request on behalf of the node; and
    receiving a registration reply that indicates success or failure of the proxy registration performed on behalf of the node, wherein the node does not support Mobile IP.

2. The method as recited in claim 1, wherein when the registration reply indicates success of the registration of the node, packets can be sent on the one of the plurality of interfaces associated with the one of the plurality of VLANs.

3. The method as recited in claim 1, wherein the registration request includes at least one of an address associated with the one of the plurality of interfaces via which data packets are to be routed or a VLAN identifier identifying the one of the plurality of VLANs via which data packets are to be routed.

4. The method as recited in claim 1, wherein the one of the plurality of interfaces corresponding to the one of the plurality of VLANs via which data packets are to be routed does not support Mobile IP, and wherein the registration request is sent via another one of the plurality of interfaces that supports Mobile IP.

5. The method as recited in claim 1, wherein at least one of the plurality of interfaces do not support Mobile IP.

6. In a network device supporting Mobile Internet Protocol (Mobile IP), the network device having a plurality of interfaces supporting a plurality of virtual local area network(s) (VLAN or VLANs), a method of performing proxy registration on behalf of a node, the method comprising:
ascertaining a subnet map of the node;
identifying a VLAN associated with the subnet map such that one of the plurality of interfaces supporting the VLAN is identified;
identifying a Home Agent associated with the subnet map or the VLAN via which to register the node;
composing a registration request on behalf of the node, the registration request identifying the node and including a Home Agent address associated with the Home Agent, the registration request indicating the one of the plurality of interfaces supporting the VLAN via which data packets are to be routed;
sending the registration request on behalf of the node; and
receiving a registration reply indicating success or failure of the proxy registration performed on behalf of the node, wherein the node does not support Mobile IP.

7. The method as recited in claim 6, wherein when the registration reply indicates success of the registration of the node, packets can be sent on the one of the plurality of interfaces associated with the one of the plurality of VLANs.

8. The method as recited in claim 6, wherein the registration request includes at least one of an address associated with the one of the plurality of interfaces via which data packets are to be routed and a VLAN identifier identifying the one of the plurality of VLANs via which data packets are to be routed.

9. The method as recited in claim 6, further comprising:
forwarding a packet to the node on one of the plurality of interfaces associated with the VLAN or receiving a packet from the node on the one of the plurality of interfaces associated with the VLAN.

10. The method as recited in claim 6, wherein the registration request includes a care-of address field identifying an Internet Protocol address (IP address) associated with one of the plurality of interfaces associated with the VLAN.

11. The method as recited in claim 10, wherein the registration request includes a VLAN tag indicating that the care-of address field includes the IP address associated with the VLAN, thereby enabling the VLAN to be identified from a mapping between one or more VLANs and one or more network prefixes or IP addresses.

12. The method as recited in claim 6, further comprising:
identifying a Foreign Agent associated with the VLAN via which to register the node; and
sending the registration request to the Foreign Agent.

13. The method as recited in claim 6, wherein Mobile IP is supported by all of the plurality of interfaces.

14. The method as recited in claim 6, wherein Mobile IP is supported by one of the plurality of interfaces.

15. The method as recited in claim 14, wherein the one of the plurality of interfaces is the native VLAN.

16. The method as recited in claim 6, wherein the registration request identifies one of the plurality of VLANs or one of the interfaces of the network device associated with the one of the plurality of VLANs.

17. The method as recited in claim 16, wherein the one of the plurality of VLANs is identified by a VLAN tag.

18. The method as recited in claim 16, wherein the one of the plurality of VLANs is identified in a VLAN extension to the registration request.

19. The method as recited in claim 16, wherein the one of the plurality of interfaces of the network device is identified by an IP address.

20. The method as recited in claim 19, wherein the IP address is identified in a care-of address field of the registration request.

21. The method as recited in claim 6, wherein the network device is an Access Point.

22. The method as recited in claim 6, further comprising:
receiving an agent advertisement from at least one of the Home Agent or a Foreign Agent associated with the subnet map or the VLAN, the agent advertisement including a VLAN tag identifying one of the VLANs; and
associating at least one of the Home Agent or the Foreign Agent with the one of the VLANs.

23. The method as recited in claim 6, further comprising:
receiving an agent advertisement from at least one of the Home Agent or a Foreign Agent associated with the subnet map or the VLAN, the agent advertisement identifying a subnet mask and an IP address;
wherein the subnet mask is used to identify the subnet map of the node.

24. The method as recited in claim 6, further comprising:
receiving an agent advertisement from at least one of a Foreign Agent or the Home Agent on one of the plurality of VLANs;
wherein sending the registration request and receiving the registration reply are performed on the one of the plurality of VLANs.

25. The method as recited in claim 24, wherein the registration request and the registration reply do not identify the one of the plurality of VLANs.

26. The method as recited in claim 6, further comprising:
receiving an agent advertisement from at least one of a Foreign Agent or the Home Agent on one of the plurality of interfaces of the network device that is not associated with the VLAN, the agent advertisement identifying the VLAN.

27. The method as recited on claim 26, wherein the agent advertisement is received on a native VLAN of the network device.

28. The method as recited in claim 26, further comprising:
sending the registration request on one of the interfaces associated with the VLAN identified in the agent advertisement; and
receiving the registration reply on the one of the interfaces associated with the VLAN identified in the agent advertisement.

29. The method as recited in claim 6, further comprising:
sending the registration request on one of the plurality of interfaces of the network device that is not associated with the VLAN.

30. The method as recited in claim 29, wherein the one of the plurality of interfaces supports Mobile IP and the interface via which data packets are to be routed to the node does not support Mobile IP.

31. The method as recited in claim 29, wherein the registration request identifies the VLAN.

32. The method as recited in claim 31, wherein the VLAN is identified in an extension to the registration request.

33. The method as recited in claim 6, further comprising:
receiving the registration reply on one of the plurality of interfaces of the network device that is not associated with the VLAN.

34. The method as recited in claim 33, wherein the interface via which data packets are to be routed to the node does not support Mobile IP.

35. The method as recited in claim 33, wherein the registration reply identifies the VLAN.

36. The method as recited in claim 35, wherein the VLAN is identified in an extension to the registration reply.

37. The method as recited in claim 6, further comprising:
receiving the registration reply on one of the interfaces associated with the VLAN.

38. The method as recited in claim 37, wherein the registration reply does not identify the VLAN.

39. The method as recited in claim 6, further comprising:
obtaining a mapping between one or more VLANs and one or more network prefixes.

40. The method as recited in claim 6, further comprising:
obtaining a mapping between a VLAN and at least one of a Home Agent or a Foreign Agent.

41. The method as recited in claim 40, wherein the mapping is obtained for a plurality of VLANs, each of the plurality of VLANs being associated with at least one of one or more Home Agents or one or more Foreign Agents.

42. The method as recited in claim 41, wherein the mapping is stored at the network device.

43. The method as recited in claim 41, wherein the mapping is obtained from a server.

44. The method as recited in claim 43, wherein the server is a Authentication, Authorization, and Accounting server (AAA server).

45. The method as recited in claim 41, wherein the mapping is obtained from a graphical user interface.

46. The method as recited in claim 40, wherein the mapping is obtained from an agent advertisement received from the Home Agent or the Foreign Agent.

47. The method as recited in claim 6, wherein identifying a Home Agent associated with the VLAN via which to register the node comprises:
searching a list of a plurality of VLANs, each of the plurality of VLANs being associated with at least one of one or more Home Agents.

48. The method as recited in claim 6, further comprising:
sending a message, the message associating each of the plurality of VLANs with one or more of the plurality of interfaces of the network device.

49. The method as recited in claim 6, further comprising:
sending a message, the message being sent on one of the plurality of interfaces and identifying one of the plurality of VLANs, thereby associating the one of the plurality of interfaces of the network device with the one of the plurality of VLANs.

50. The method as recited in claim 6, wherein the one of the plurality of interfaces corresponding to the one of the plurality of VLANs via which data packets are to be routed does not support Mobile IP, and wherein the registration request is sent via another one of the plurality of interfaces that supports Mobile IP.

51. The method as recited in claim 6, wherein at least one of the plurality of interfaces do not support Mobile IP.

52. A method of processing a registration request, comprising:
receiving a registration request from a network device supporting Mobile Internet Protocol (Mobile IP), the registration request identifying a node that does not support Mobile IP and at least one of an interface address identifying an interface of the network device associated with one of a plurality of Virtual Local Area Networks (VLANs) or a Virtual Local Area Network (VLAN) identifier identifying one of a plurality of VLANs of the network device;
processing the registration request such that a binding between the node and the interface of a the network device is generated, thereby enabling data packets to be routed to the node via the interface of the network device; and
sending a registration reply to the network device.

53. The method as recited in claim 52, wherein the interface address is provided in a care-of address field of the registration request.

54. The method as recited in claim 52, wherein the registration request includes an extension including the VLAN identifier.

55. The method as recited in claim 52, wherein the network device is a Foreign Agent.

56. The method as recited in claim 52, further comprising:
sending an agent advertisement including a VLAN identifier identifying one of the plurality of VLANs.

57. The method as recited in claim 52, wherein the registration reply identifies one of the plurality of VLANs.

58. The method as recited in claim 52, wherein the registration reply identifies at least one of the one of the plurality of VLANs or an interface address associated with the one of the plurality of VLANs.

59. The method as recited in claim 52, wherein the registration reply is transmitted on one of a plurality of interfaces of that is not associated with the one of the plurality of VLAN.

60. The method as recited in claim 59, wherein the one of the plurality of interfaces supports Mobile IP and the interface via which data packets are to be routed to the node does not support Mobile IP.

61. The method as recited in claim 52, wherein the registration reply is transmitted on one of a plurality of interfaces of the network device, wherein the one of the plurality of interfaces is associated with the one of the plurality of VLANs.

62. The method as recited in claim 61, wherein the registration reply does not identify the one of the plurality of VLANs.

63. A computer-readable medium storing thereon computer-readable instructions for processing a registration request, comprising:
instructions for receiving a registration request from a network device supporting Protocol (Mobile IP), the registration request identifying a node that does not support Mobile IP and at least one of an interface address identifying an interface of the network device that is associated with one of a plurality of Virtual Local Area Networks (VLANs) or a Virtual Local Area Networks (VLAN) identifier identifying one of a plurality of VLANs of the network device;
instructions for processing the registration request such that a binding between the node and the interface of the network device is generated, thereby enabling data packets to be routed to the node via the interface of the network device; and
instructions for sending a registration reply to the network device.

64. An apparatus supporting Mobile Internet Protocol (Mobile IP) and adapted for processing a registration request, comprising:
means for receiving a registration request from a network device supporting Mobile IP, the registration request identifying a node and at least one of an interface address identifying an interface of the network device that is associated with one of a plurality of Virtual Local Area Networks (VLANs) or a Virtual Local Area Networks (VLAN) identifier identifying one of a plurality of VLANs of the network device, wherein the node does not support Mobile IP;

means for processing the registration request such that a binding between the node and the interface of the network device is generated, thereby enabling data packets to be routed to the node via the interface of the network device: and means for sending a registration reply to the network device.

65. An apparatus supporting Mobile Internet Protocol (Mobile IP) and adapted for processing a registration request, comprising:

a processor; and a memory, at least one of the processor or the memory being adapted for:

receiving a registration request from a network device supporting Mobile IP, the registration request identifying a node and at least one of an interface address identifying an interface of the network device that is associated with one of a plurality of Virtual Local Area Networks (VLANs) or a Virtual Local Area Network (VLAN) identifier identifying one of a plurality of VLANs of the network device, wherein the node does not support Mobile IP;

processing the registration request such that a binding between the node and the interface of the network device is generated, thereby enabling data packets to be routed to the node via the interface of the network device: and sending a registration reply to the network device.

66. The apparatus as recited in claim 65, wherein the registration request includes the interface address of the interface of the network device that is associated with one of the plurality of VLANs, wherein the registration request is received via the interface, wherein the interface supports Mobile IP.

67. The apparatus as recited in claim 66, wherein the registration request does not identify the VLAN.

68. The apparatus as recited in claim 66, wherein at least one of the plurality of interfaces does not support Mobile IP.

69. The apparatus as recited in claim 65, wherein the registration request is not received via the interface, wherein the interface does not support Mobile IP.

70. The apparatus as recited in claim 69, wherein the registration request includes the VLAN identifier identifying one of the plurality of VLANs.

* * * * *